United States Patent [19]

Kajander et al.

[11] Patent Number: 5,232,745
[45] Date of Patent: Aug. 3, 1993

[54] METHOD OF NEUTRALIZING ACID CONTAINING COMPOSITIONS PRESENT IN AN INSULATION BOARD

[75] Inventors: Richard E. Kajander, Toledo, Ohio; Eric J. Adamczyk, Littleton, Colo.

[73] Assignee: Manville Corporation, Denver, Colo.

[21] Appl. No.: 664,541

[22] Filed: Mar. 1, 1991

[51] Int. Cl.⁵ .............................................. B05D 3/00
[52] U.S. Cl. .................................... 427/444; 162/160; 422/13; 528/488
[58] Field of Search ................. 427/439, 444; 422/13; 162/160; 528/488

[56] References Cited

U.S. PATENT DOCUMENTS

| | | | |
|---|---|---|---|
| 3,671,355 | 6/1972 | Paymal | 156/324 |
| 3,898,356 | 8/1975 | Williams et al. | 427/343 |
| 4,049,852 | 9/1977 | Smith et al. | 428/55 |
| 4,082,885 | 4/1978 | Rashid et al. | 428/281 |
| 4,371,579 | 2/1983 | McCaskey et al. | 428/204 |
| 4,394,411 | 7/1983 | Krull et al. | 428/70 |
| 4,444,912 | 4/1984 | Carlson et al. | 521/121 |
| 4,459,334 | 7/1984 | Blanpied et al. | 428/219 |
| 4,478,958 | 10/1984 | Carlson et al. | 521/121 |
| 4,522,843 | 6/1985 | Kundrot | 427/27 |
| 4,539,338 | 9/1985 | Carlson et al. | 521/131 |
| 4,567,093 | 1/1986 | Sogabe et al. | 428/250 |
| 4,596,738 | 6/1986 | Metcalfe et al. | 428/308.4 |
| 4,600,634 | 7/1986 | Langer | 428/220 |
| 4,606,958 | 8/1986 | Haq et al. | 428/68 |
| 4,634,498 | 1/1987 | Hardesty et al. | 162/9 X |
| 4,637,951 | 1/1987 | Gill et al. | 428/215 |
| 4,681,798 | 7/1987 | Gill et al. | 428/215 |
| 4,784,897 | 11/1988 | Brands et al. | 428/219 |
| 4,956,394 | 9/1990 | Kifer et al. | 521/84.1 |
| 5,001,005 | 3/1991 | Blanpied | 428/283 |

FOREIGN PATENT DOCUMENTS

| | | |
|---|---|---|
| 1151519 | 8/1983 | Canada . |
| 3120342 | 12/1982 | Fed. Rep. of Germany . |
| 1160891 | 8/1969 | United Kingdom . |

Primary Examiner—Michael Lusignan
Attorney, Agent, or Firm—Cornelius P. Quinn

[57] ABSTRACT

Described is a method of neutralizing acid containing compositions present in an insulation board comprising the steps of providing an insulation board containing a leachable acid composition and neutralizing the leachable acid by applying to the board an effective neutralizing amount of an inorganic alkali metal or alkaline earth metal salt. Preferably, the board is a phenolic foam having opposing sides of a fiberglass facer with the neutralizing agent embedded in the fiberglass facer.

21 Claims, 1 Drawing Sheet

U.S. Patent     Aug. 3, 1993     5,232,745
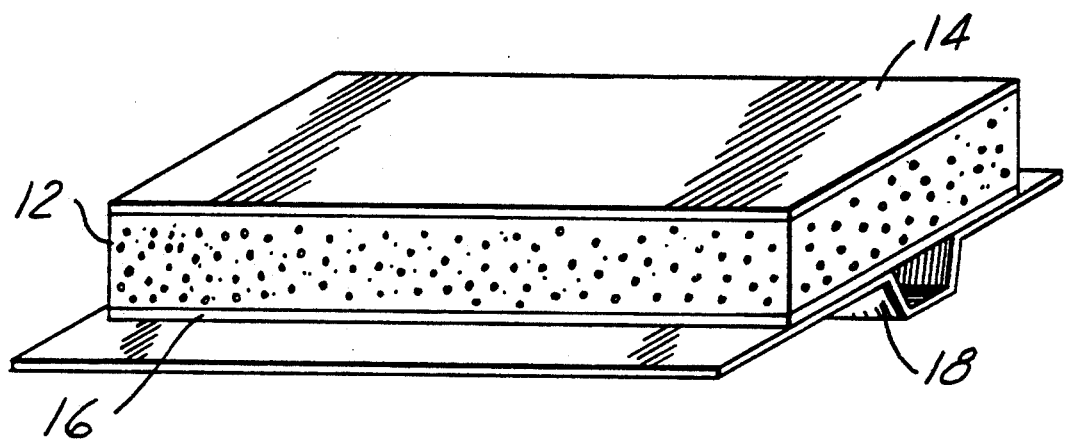

5,232,745

METHOD OF NEUTRALIZING ACID CONTAINING COMPOSITIONS PRESENT IN AN INSULATION BOARD

TECHNICAL FIELD

The present invention is concerned with insulation boards that have detectable leachable acid compositions.

BACKGROUND ART

Boards containing insulation materials such as phenolic foams, perlite boards, fiberglass containing boards or composition boards (chip board, hardboard or wood particle board) have a tendency upon exposure to substantial humidity or water to leach an acid therefrom. The acid may be present due to impurities in the reagents and/or as a portion of an under-utilized catalyst in the manufacture of insulation board materials. The acid may also be present due to breakdown of reagents due to prolonged exposure to water.

Phenolic foams prepared utilizing sulfonic acid catalysts are described in U.S. Pat. Nos. 4,474,958; 4,444,912; 4,539,338; and 4,956,394.

Fiberglass facer materials are taught in U.S. Pat. Nos. 4,637,951; 4,681,798; and 4,596,737.

None of the references teach the concern of unreacted acidic catalyst or acid containing reagent which may be reactive in a high humidity environment and/or prolonged exposure to water.

SUMMARY OF THE INVENTION

Described is a method of neutralizing acid containing compositions present in an insulation board comprising the steps of providing an insulation board containing a leachable acid composition and neutralizing the leachable acid by applying to the board an effective neutralizing amount of an inorganic alkali metal or alkaline earth metal salt.

Preferably, the board is a phenolic foam having opposing sides of a fiberglass facer with the neutralizing agent embedded in the fiberglass facer.

BRIEF DESCRIPTION OF THE DRAWINGS

FIG. 1 is a schematic drawing of the insulation board in contact with a metallic support roof with a dual fiberglass facer containing the neutralizing agent in the facers.

DESCRIPTION OF PREFERRED EMBODIMENTS

The present invention is concerned with addressing the concern as to a leachable acid that would be present in an insulation board. A number of ways of preparing the board and fiberglass facers are well known in the art. See the U.S. patents cited above especially as to phenolic foam utilizing aryl sulfonic acid catalyst. Other insulation boards can be a homogeneous board, the principal component of which is expanded perlite, a volcanic ore and other water absorbing material that can hold water for prolonged time. Other insulation boards may contain an acid that is leachable under high humidity or water conditions. Other such boards are wood or cellulosic-based insulation boards, such as plywood, composition boards, alum containing boards, and the like.

It is to be appreciated that the insulation board can be a source of a leachable acid from a variety of sources including the adhesives or resins that bind the board (as in fiberglass or particle board), such as urea formaldehyde resins, phenolic resins, resorcinol-phenol-aldehyde resins, and the like. Inorganic acids may likewise leach from primarily inorganic or mineral-based insulation boards.

In a preferred fashion, the insulation board has at least one facer of fiberglass. A preferred embodiment, as shown in the drawing where the insulation board 12 has fiberglass facers 14 (top) and 16 (bottom) on opposite sides of the foam board. The board acts as insulation for a roof top or wall 18. The manufacturing techniques of the phenolic foam with the fiberglass facers are described in the U.S. patents cited above.

The fiberglass material that can be employed is any commercially available fiberglass mat material. In commercial practice, the phenolic foam is caused to expand between the fiberglass facers 14 and 16 as best shown in U.S. Pat. No. 4,956,394.

In general, the fiberglass has an average diameter of about 8 to about 16 microns, preferably about 10 microns and is about ¼ inch to about 1 inch, preferably about ½ inch in length and is formed into a mat or batting. The fiberglass, prior to the phenolic foaming operation, may be subjected to the insertion of the acid neutralizing agent. In general, the neutralizing agent is applied as an aqueous composition containing alkali metal or alkaline earth metal salts. The alkali metals are sodium, potassium or mixtures thereof and the like. The alkaline earth metal materials that may be used are calcium, magnesium, barium, zinc, or mixtures thereof and the like. The salts that can be used are the carbonates, phosphates, silicates, mixtures thereof and the like. Suitable materials would be calcium carbonate, calcium magnesium carbonate, barium carbonate, calcium metasilicate, sodium potassium aluminum silicate, sodium and/or potassium phosphate and the like. It is most preferred that the material that is utilized be extremely inexpensive, therefore minerals may be utilized such as marble, limestone, dolomite, talc, and the like.

The aqueous neutralizing agent composition may be applied directly to the insulation board by spraying or dipping or roll-coating the composition onto the board. Alternatively, the fiberglass facer can be sprayed, dipped or roll-coated with the neutralizing agent composition prior to the foaming operation. If the neutralizing agent composition is applied to the fiberglass facer after the foaming operation, in all likelihood the neutralizing agent composition would be applied by spraying or roll-coating the exterior surfaces of facers 14 and 16 with the composition. Alternatively, the aqueous composition could be applied to the facer by curtain coating, that is, the facer is passed through a curtain of aqueous composition.

It is preferable that the neutralizing agent composition likewise have incorporated therein a binder for the fiberglass material. Any number of commercially available thermoplastic or thermoset binders can be utilized. Preferably, the binder is a thermoset binder such as a urea formaldehyde resin, a phenol formaldehyde resin, a melamine formaldehyde resin and the like. If a urea formaldehyde resin is employed, some materials that may be utilized are those available from Borden Company or Georgia Pacific Company such as Resi-Mat GP 2967 and the like. Latexes may likewise be utilized such as acrylic-based latex available from Rohm & Haas under the trademark Rhoplex ®. Other latexes such as polyvinylacetate may be utilized such as products from Air Products of Pennsylvania sold under the trademark Airflex ®. Suitable polyvinylchloride materials may be used and are available from BF Goodrich under the trademark HyCar ® or Geon ®.

The preferred technique is to curtain coat or dip the fiberglass facer into the neutralizing agent composition which also contains the binder and then drying prior to inserting the fiberglass into the phenolic foaming operation.

When the combined binder system and neutralizing agent are utilized for application to the fiberglass, the final fiberglass composition may contain from 35 to 80 percent fiberglass with the binder being from 10 to 35 percent and the neutralizing agent being approximately 5 to 45 percent, the total being 100 percent by weight. The most preferred composition has 50 percent by weight fiberglass, 25 percent by weight binder and 25 percent by weight neutralizing agent (calculated as calcium carbonate).

A preferred binder: neutralizing agent formulation utilizes by weight 23% binder (comprised of 75% urea formaldehyde and 25% vinyl acetate), 21% $CaCo_3$ and 56% fiberglass.

An added advantage of utilizing the carbonate or in particular calcium carbonate as a neutralizing agent is a desirable whiteness in color for the end product fiberglass.

When calcium carbonate is utilized as the neutralizing agent, it is generally utilized in the size of about 0.1 to 50 microns in diameter, preferably with a median diameter of 0.8 microns. The final glass fiber mat treated with the neutralizing agent can have a wide variety of porosities and densities such as from 5 to about 800 CFM/per square foot air porosity as measured by a Frazier meter.

It is most preferred that the amount of neutralizing agent present on the glass fiber ranges from about 0.1 to 20 grams per square foot of fiberglass mat (calculated as calcium carbonate), even more preferably 0.5 to 10, and even more preferably 0.5 to 5 grams per square foot.

In general, the insulation board is applied on top of a painted or galvanized steel roof or wall. The insulation board as described herein therefore decreases the surface corrosion of the roof or wall because the leachable acid is neutralized prior to contact with the roof or wall.

On occasion it may be desirable to add phosphate containing compositions to the aqueous neutralizing acid to assist in the treatment with the substrate on which the insulation board fiberglass composite is applied, mainly painted steel. Such phosphate containing compositions are phosphate coesters such as alcohols and ethoxylates available from Dexter Chemical under the trademark Strodex ® such as the PK95G or PSK28 products. Those products would be added in the range of about ½ percent to 10 percent by weight of the total end product, namely the treated fiberglass.

It is preferred that the final fiberglass mat with the neutralizing agent included should have air porosity of about 5 to 800 CFM (cubic feet per minute) per square foot, preferably 100-600 and most preferably 400 to 600, as measured by a Frazier meter. The thickness of the fiberglass mat can range from about 10 to 50 mils, preferably 15 to 35 mils.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method of neutralizing acid containing compositions present in an insulation board comprised of a phenolic foam, comprising the steps of:
   providing an insulation board comprised of a phenolic foam and containing a leachable acid composition and neutralizing the leachable acid by applying to the board an effective neutralizing amount of an inorganic alkali metal or alkaline earth metal salt.

2. The method of claim 1 wherein the leachable acid is an organic acid.

3. The method of claim 2 wherein the leachable acid is an aromatic sulfonic acid.

4. The method of claim 2 wherein the leachable acid is an inorganic acid.

5. The method of claim 1 wherein the insulation board is comprised of a fiberglass facer on at least one side of the board and the neutralizing step is effected by having the inorganic alkali metal or alkaline earth metal salt included in the facer.

6. The method of claim 5 wherein the fiberglass facer is curtain coated with an aqueous solution of the inorganic alkali metal or alkaline earth metal salt.

7. The method of claim 1 wherein the alkaline earth metal salt is selected from the group consisting of calcium, magnesium and barium salts.

8. The method of claim 7 wherein the fiberglass facer, after insertion of the neutralizing amount of alkali metal or alkaline earth metal salt, has air porosity ranging from 5 to 800 CFM per square foot.

9. The method of claim 8 wherein the fiberglass facer is comprised of 35 to 80% by weight of fiberglass, 10 to 35% of a binder and 5 to 45% of the alkali metal or alkaline earth metal salt, the total being 100%.

10. The method of claim 1 wherein the salt is calcium carbonate.

11. A method of decreasing the surface corrosion of metallic substrates having an insulation board attached thereto, comprising the steps of:
    providing an insulation board containing a leachable acid composition; and
    neutralizing the leachable acid by applying to the board an effective neutralizing amount of an inorganic alkali metal or alkaline earth metal salt.

12. The method of claim 11 wherein the insulation board is comprised of a phenolic foam.

13. The method of claim 11 wherein the leachable acid is an organic acid.

14. The method of claim 13 wherein the leachable acid is an aromatic sulfonic acid.

15. The method of claim 13 wherein the leachable acid is an inorganic acid.

16. The method of claim 11 wherein the insulation board is comprised of a fiberglass facer on at least one side of the board and the neutralizing step is effected by having the inorganic alkali metal or alkaline earth metal salt included in the facer.

17. The method of claim 16 wherein the fiberglass facer is curtain coated with an aqueous solution of the inorganic alkali metal or alkaline earth metal salt.

18. The method of claim 11 wherein the alkaline earth metal salt is selected from the group consisting of calcium, magnesium and barium salts.

19. The method of claim 18 wherein the fiberglass facer, after insertion of the neutralizing amount of alkali metal or alkaline earth metal salt, has air porosity ranging from 5 to 800 CFM per square foot.

20. The method of claim 18 wherein the fiberglass facer is comprised of 35 to 80% of fiberglass, 10 to 35% of a binder and 5 to 45% of the alkali metal or alkaline earth metal salt, the total being 100%.

21. The method of claim 11 wherein the salt is calcium carbonate.

* * * * *